(12) United States Patent
Hiwatari et al.

(10) Patent No.: US 10,768,877 B2
(45) Date of Patent: Sep. 8, 2020

(54) PRINT JOB TRANSMISSION DEVICE, PRINTING SYSTEM, AND PRINT JOB TRANSMISSION METHOD

(71) Applicant: KYOCERA Document Solutions Inc., Osaka (JP)

(72) Inventors: Tatsuya Hiwatari, Osaka (JP); Keiji Tsuda, Osaka (JP); Masafumi Sato, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/533,518

(22) Filed: Aug. 6, 2019

(65) Prior Publication Data

US 2020/0089451 A1 Mar. 19, 2020

(30) Foreign Application Priority Data

Sep. 13, 2018 (JP) ................. 2018-171566

(51) Int. Cl.
*G06F 3/12* (2006.01)
(52) U.S. Cl.
CPC .......... *G06F 3/1268* (2013.01); *G06F 3/1205* (2013.01); *G06F 3/1212* (2013.01); *G06F 3/1288* (2013.01)
(58) Field of Classification Search
CPC .... G06F 3/1268; G06F 3/1205; G06F 3/1212; G06F 3/1288; G06F 3/1289
See application file for complete search history.

(56) References Cited

U.S. PATENT DOCUMENTS

| | | | |
|---|---|---|---|
| 2002/0083058 A1* | 6/2002 | Hsiao | G06F 21/105 |
| 2004/0170460 A1* | 9/2004 | Mokuya | G06F 3/121 |
| | | | 400/76 |
| 2006/0031711 A1* | 2/2006 | Yokokura | H04L 41/00 |
| | | | 714/5.1 |
| 2006/0031906 A1 | 2/2006 | Kaneda | 725/113 |
| 2007/0074257 A1* | 3/2007 | Tamura | H04N 1/00244 |
| | | | 725/104 |
| 2013/0021641 A1* | 1/2013 | Park | G06F 3/121 |
| | | | 358/1.14 |

FOREIGN PATENT DOCUMENTS

| | | |
|---|---|---|
| JP | 2005-222161 A | 8/2005 |
| JP | 2006-50465 A | 2/2006 |
| JP | 2008-21233 A | 1/2008 |

\* cited by examiner

*Primary Examiner* — Moustapha Diaby
(74) *Attorney, Agent, or Firm* — Stein IP, LLC (57) ABSTRACT

A device communication portion 35a transmits a print job to an image forming apparatus 20 and obtains information of the image forming apparatus 20 from the image forming apparatus 20. A server communication portion 35b transmits the information having been obtained from the image forming apparatus 20 to a server 40 which manages the information of the image forming apparatus 20. The device communication portion 35a obtains specific information of the image forming apparatus 20 from the image forming apparatus 20 with timing that is independent of timing of transmitting the print job to the image forming apparatus.

9 Claims, 11 Drawing Sheets

PRINT JOB TRANSMISSION DEVICE, PRINTING SYSTEM, AND PRINT JOB TRANSMISSION METHOD

INCORPORATION BY REFERENCE

This application is based upon and claims the benefit of priority from the corresponding Japanese Patent Application No. 2018-171566 filed on Sep. 13, 2018, the entire contents of which are incorporated herein by reference.

BACKGROUND

The present disclosure relates to a print job transmission device which transmits a print job to an image forming apparatus, a printing system including the same, and a print job transmission method.

Conventionally, there has been known a technology in which a server is used to manage the number of copies printed or, for example, alerts for a sheet-jam and so on in an image forming apparatus. In the technology, counter information indicating the number of copies printed in the image forming apparatus or alert information indicating an alert is transmitted from the image forming apparatus via a network to the server, and managed by the server.

However, in the conventional technology, the image forming apparatus and the server need to be communicably connected to each other via a network, and this is inconvenient.

SUMMARY

According to an aspect of the present disclosure, a print job transmission device includes a device communication portion which communicates with an image forming apparatus, which executes a print job, to transmit the print job to the image forming apparatus and obtain information of the image forming apparatus from the image forming apparatus, and a server communication portion which transmits the information having been obtained by the device communication portion to a server which manages the information of the image forming apparatus. Here, the device communication portion obtains specific information of the image forming apparatus from the image forming apparatus with timing that is independent of the timing of transmitting the print job to the image forming apparatus.

Further features and advantages of the present disclosure will become apparent from the description of embodiments given below.

DETAILED DESCRIPTION

Figure 1:
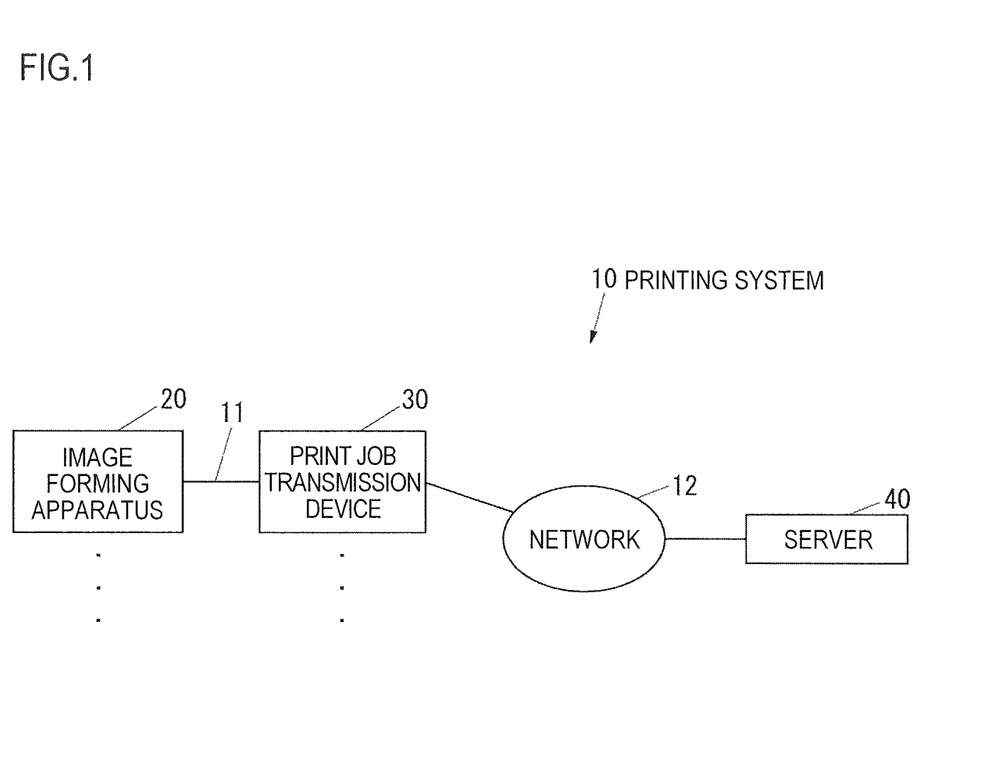
FIG. 1 is a block diagram illustrating a printing system according to an embodiment of the present disclosure.

Hereinafter, embodiments of the present disclosure will be described with reference to the accompanying drawings. FIG. 1 is a block diagram illustrating a printing system 10 according to the present embodiment. As shown in FIG. 1, the printing system 10 includes an image forming apparatus 20, a print job transmission device 30, a server 40, and a network 12.

The image forming apparatus 20 is constituted by, for example, an MFP (multifunction peripheral), a print-only printer, or the like. The printing system 10 may include a plurality of such image forming apparatuses as the image forming apparatus 20.

The print job transmission device 30 is constituted by a computer such as a personal computer (PC), for example. The printing system 10 may include a plurality of such print job transmission devices as the print job transmission device 30. The image forming apparatus 20 and the print job transmission device 30 are communicable with each other via a cable 11 which is, for example, a USB (universal serial bus) cable.

The server 40 may be constituted by a computer, or may be constituted by a plurality of computers. The print job transmission device 30 and the server 40 are communicable with each other via the network 12, which is, for example, a LAN (local area network). Note that the image forming apparatus 20 and the server 40 are not directly communicable with each other.

Figure 2:
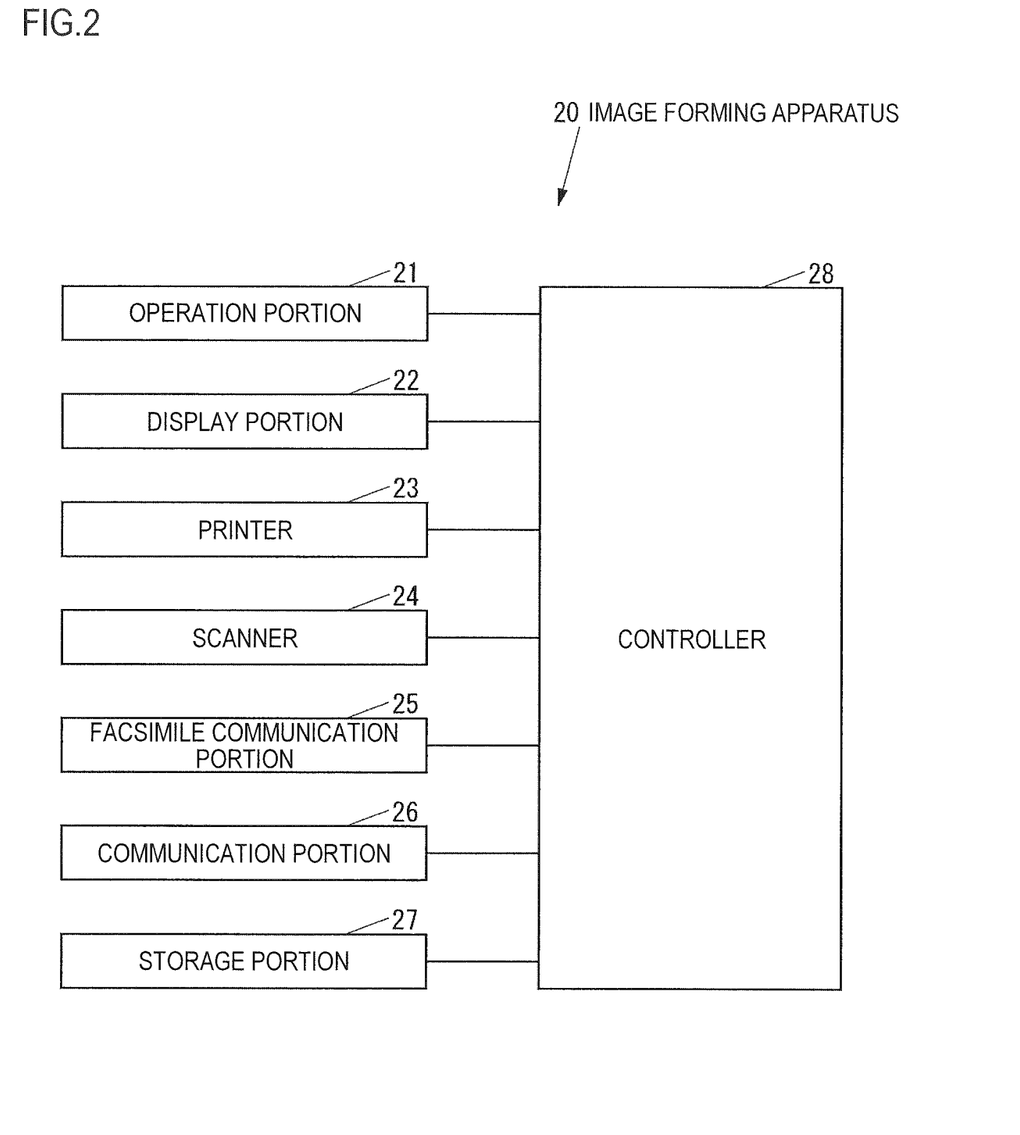
FIG. 2 is a block diagram illustrating an image forming apparatus shown in FIG. 1 in a case where the image forming apparatus is an MFP.

FIG. 2 is a block diagram illustrating the image forming apparatus 20 in a case where it is an MFP. The image forming apparatus 20 shown in FIG. 2 includes an operation portion 21, a display portion 22, a printer 23, a scanner 24, a facsimile communication portion 25, a communication portion 26, a storage portion 27, and a control portion 28.

The operation portion 21 is an operation device including buttons, for example, via which various operations are inputted. The display portion 22 is a display device such as an LCD (liquid crystal display), and displays various pieces of information. The printer 23 is a printing device which prints an image on a recording medium such as a paper sheet. The scanner 24 is a reading device which reads an image from a document.

The facsimile communication portion 25 is a facsimile device which performs facsimile communication with an unillustrated external facsimile machine via a communication line such as a public telephone line. The communication portion 26 is a communication device which performs direct wired or wireless communication with an external device via, or not via, a network such as a LAN, the Internet, etc. The storage portion 27 is a nonvolatile storage device such as a semiconductor memory, an HDD (hard disc drive), etc., and stores various pieces of information.

The control portion 28 controls the entire image forming apparatus 20. The control portion 28 includes, for example, a CPU (central processing unit), a ROM (read only memory), and a RAM (random access memory). The ROM stores a program and various pieces of data. The RAM is used as a work area for the CPU of the control portion 28. The CPU executes the program stored in the storage portion 27 or in the ROM of the control portion 28.

Figure 3:
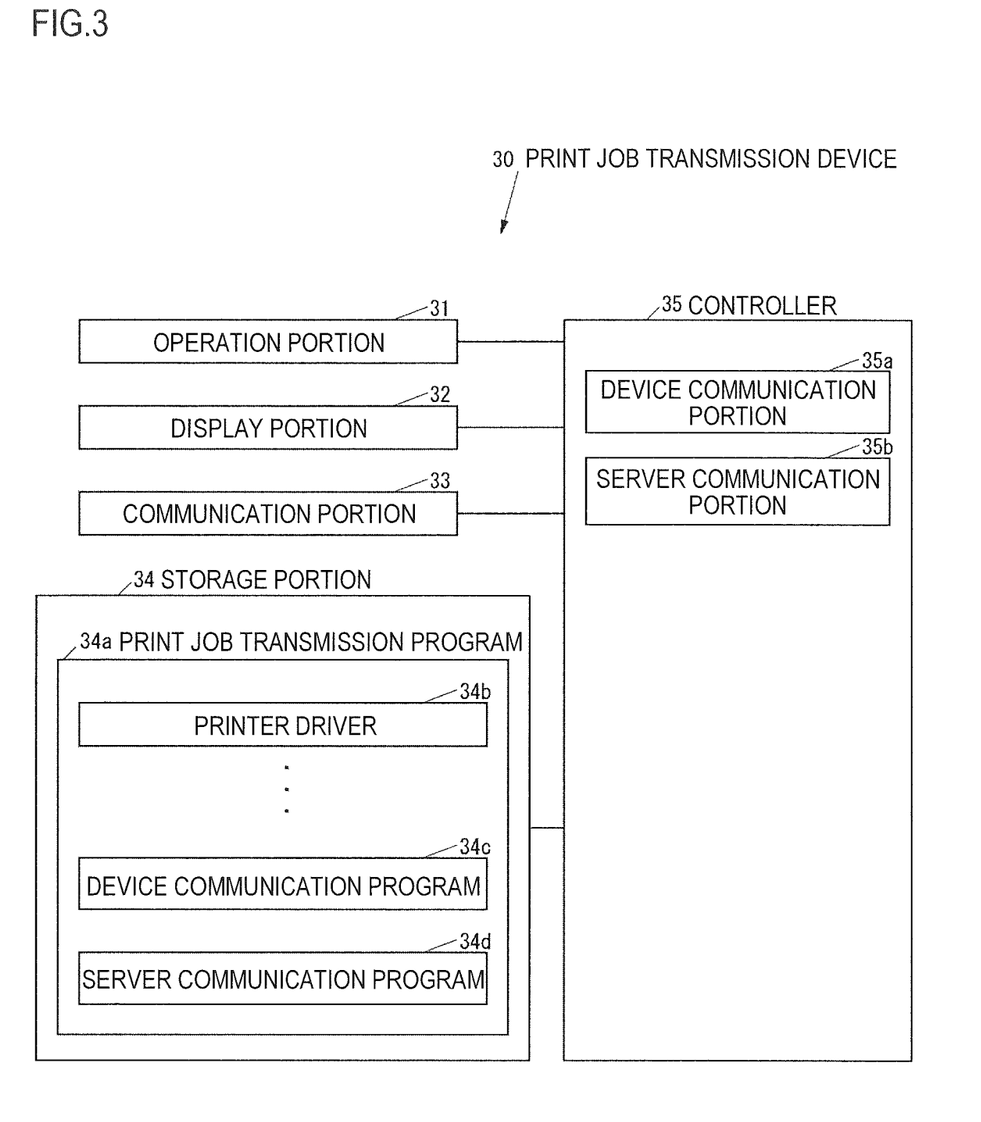
FIG. 3 is a block diagram illustrating a print job transmission device shown in FIG. 1.

FIG. 3 is a block diagram illustrating the print job transmission device 30. The print job transmission device 30 shown in FIG. 3 includes an operation portion 31, a display portion 32, a communication portion 33, a storage portion 34, and a control portion 35.

The operation portion 31 is an operation device such as a key board, a mouse, etc., for example, via which various operations are inputted. The display portion 32 is a display device such as an LCD, for example, and displays various pieces of information. The communication portion 33 is a communication device which performs direct wired or wireless communication with an external device via, or not via, a network such as a LAN, the Internet, etc.

The control portion 35 controls the entire print job transmission device 30. The control portion 35 includes a CPU, a ROM, and a RAM, for example. The ROM stores a program and various pieces of data. The RAM is used as a work area for the CPU of the control portion 35. The CPU executes the program stored in the storage portion 34 or in the ROM of the control portion 35.

The control portion 35 is provided with a device communication portion 35a and a server communication portion 35b, which are each realized by running a program. A device communication program 34c stored in the storage portion 34, which will be described later, is run to make the device communication portion 35a execute communication with the image forming apparatus 20. A server communication program 34d stored in the storage portion 34, which will be described later, is run to make the server communication portion 35b execute communication with the server 40.

The storage portion 34 is a nonvolatile storage device such as a semiconductor memory, an HDD, etc., and stores various pieces of information. The storage portion 34 includes a print job transmission program 34a for transmitting a print job to the image forming apparatus 20. The print job transmission program 34a includes a printer driver 34b, the device communication program 34c, and the server communication program 34d.

The printer driver 34b is provided for each model of image forming apparatuses 20 included in the printing system 10. The device communication program 34c is a program for achieving communication with the image forming apparatus 20. The server communication program 34d is a program for achieving communication with the server 40.

The print job transmission program 34a is installed in the print job transmission device 30 in, for example, the manufacturing stage of the print job transmission device 30. The print job transmission program 34a may be additionally installed in the print job transmission device 30 from an external storage medium such as a CD (compact disc), a DVD (digital versatile disc), a USB memory, or the like. Or, the print job transmission program 34a may be additionally installed in the print job transmission device 30 via a network.

Here, a UI (user interface) of the printer driver 34b is capable of accepting settings for the image forming apparatus 20 of the corresponding model via the operation portion 31. At this time, the same settings are made for an image forming apparatus of the same model as the image forming apparatus 20. The settings for the image forming apparatus 20 include a setting of whether or not to execute "obtaining the device information and the user session information from the image forming apparatus 20 to transmit the obtained pieces of information to the server 40".

Here, the device information is information of the image forming apparatus 20, and includes a serial number of the image forming apparatus 20, toner information, alert information, and counter information of the image forming apparatus 20. The alert information indicates an alert for a sheet jam, for example, occurring in the image forming apparatus 20. The counter information indicates the cumulative number of copies immediately after the execution of a target job is finished.

The user session information indicates which user has instructed transmission of the target job to the image forming apparatus 20. The user session information includes a user name, a serial number, a model name, a job name of the target job, time information, and the counter information.

The user name is the name of a user who is currently logging in to the print job transmission device 30. The serial number and the model name are those of the image forming apparatus 20 that is the destination of the target job. The time information indicates the time (the date and time) when the target job has been transmitted to the image forming apparatus 20. The counter information indicates the cumulative number of copies that have been printed in the image forming apparatus 20 until immediately before the execution of the target job.

Figure 4:
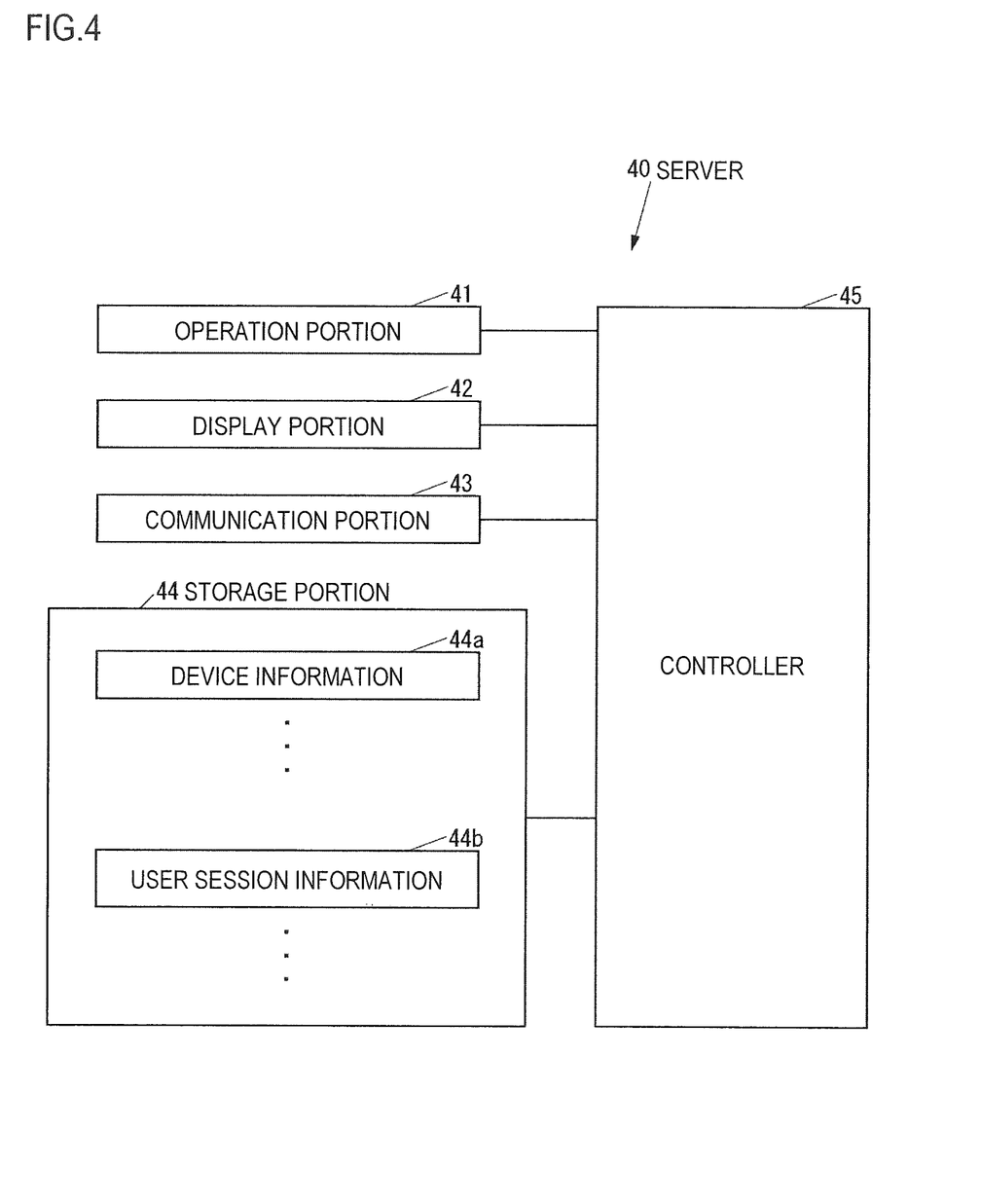
FIG. 4 is a block diagram illustrating a server shown in FIG. 1 in a case where the server is constituted by a computer.

FIG. 4 is a block diagram illustrating the server 40 in a case where it is constituted by a computer. The server 40 shown in FIG. 4 includes an operation portion 41, a display portion 42, a communication portion 43, a storage portion 44, and a control portion 45.

The operation portion 41 is an operation device such as a key board, a mouse, etc., for example, via which various operations are inputted. The display portion 42 is a display device such as an LCD, for example, and displays various pieces of information. The communication portion 43 is a communication device which performs direct wired or wireless communication with an external device via, or not via, a network such as a LAN, the Internet, etc.

The storage portion 44 is a nonvolatile storage device such as a semiconductor memory, an HDD, etc., and stores various pieces of information. The storage portion 44 is capable of storing device information 44a of the image forming apparatus 20 and user session information 44b of a user.

The control portion 45 controls the entire server 40. The control portion 45 includes a CPU, a ROM, and a RAM, for example. The ROM stores a program and various pieces of data. The RAM is used as a work area for the CPU of the control portion 45. The CPU executes the program stored in the storage portion 44 or in the ROM of the control portion 45.

Figure 5:
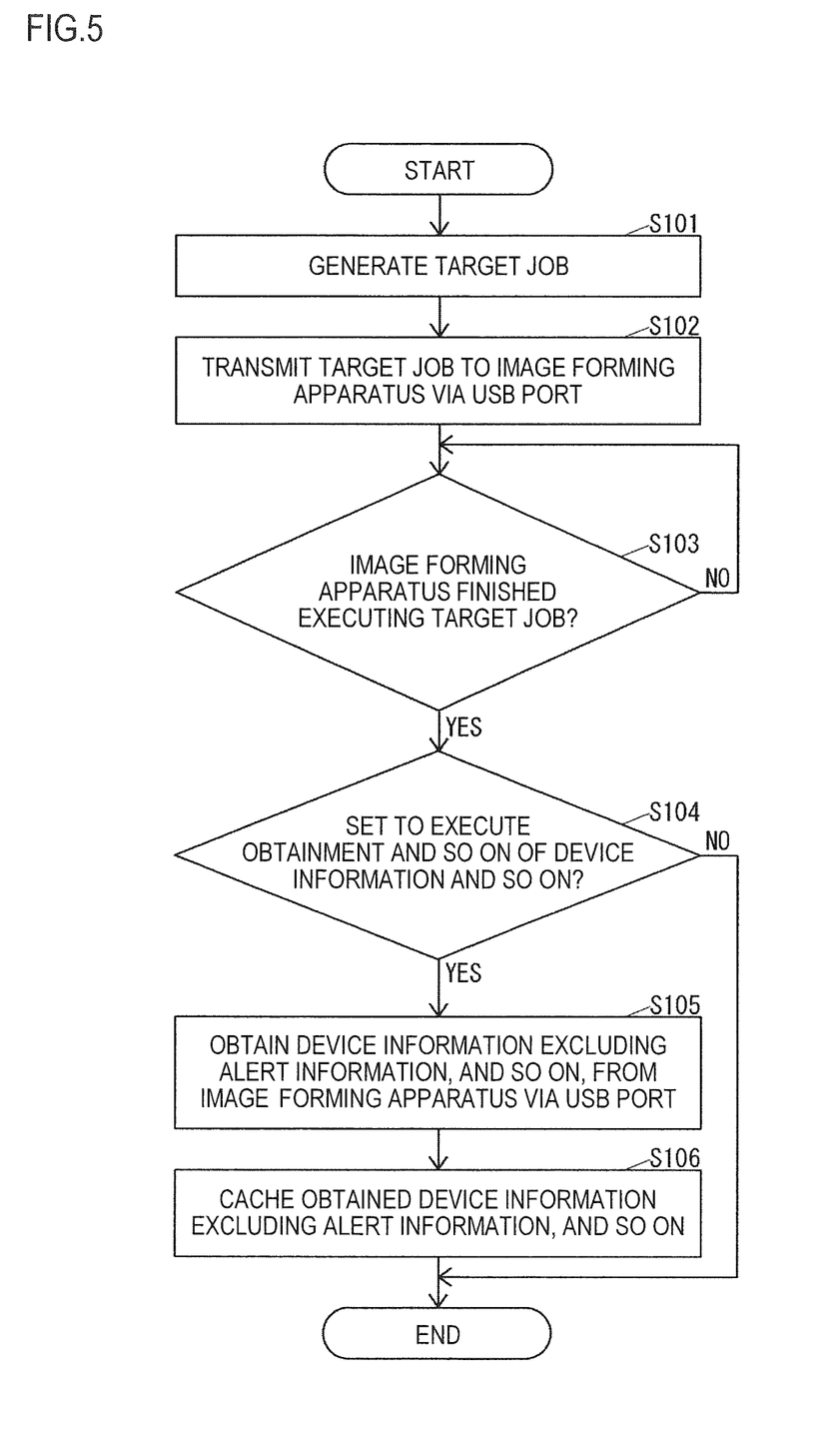
FIG. 5 is a flowchart illustrating an operation of the print job transmission device shown in FIG. 3 performed to transmit a print job to the image forming apparatus.

Next, a description will be given of an operation of the printing system 10. FIG. 5 is a flowchart illustrating an operation of the print job transmission device 30 performed to transmit a print job to the image forming apparatus 20. When an instruction to transmit a print job to the image forming apparatus 20 is given via the operation portion 31, the control portion 35 of the print job transmission device 30 executes the operation shown in FIG. 5.

In step S101, the control portion 35 of the print job transmission device 30 generates a print job (hereinafter referred to as "the target job"). The target job is generated by using the printer driver 34*b* that is stored in the storage portion 34 and compatible with the image forming apparatus 20. In step S102, the device communication portion 35*a* transmits the target job to the image forming apparatus 20 via a USB port. Thereby, the control portion 28 of the image forming apparatus 20 executes the target job, which has been transmitted from the print job transmission device 30, by using the printer 23.

In step S103, the device communication portion 35*a* stands by until the execution of the target job by the image forming apparatus 20 is finished, and the process proceeds to step S104 when the target job is finished. In step S104, the device communication portion 35*a* makes a judgment on whether or not a setting has been made such that "obtaining the device information and the user session information from the image forming apparatus 20 to transmit the obtained pieces of information to the server 40" is to be executed.

In a case where a setting has been made such that "obtaining the device information and the user session information from the image forming apparatus 20 to transmit the obtained pieces of information to the server 40" is not to be executed, the operation shown in FIG. 5 is finished.

In a case where a setting has been made such that "obtaining the device information and the user session information from the image forming apparatus 20 to transmit the obtained pieces of information to the server 40" is to be executed, the process proceeds to step S105. In step S105, the device communication portion 35*a*, by a PJL (printer job language) command, obtains the user session information and the device information excluding the alert information from the image forming apparatus 20 via the USB port.

Thus, the device communication portion 35*a* obtains the user session information and the device information excluding the alert information with timing that is dependent on the timing of transmitting the print job to the image forming apparatus 20.

In step S106, the server communication portion 35*b* caches the user session information and the device information excluding the alert information, the user session information and the device information having been obtained in step S105. Then, the operation illustrated in FIG. 5 is finished.

Figure 6:
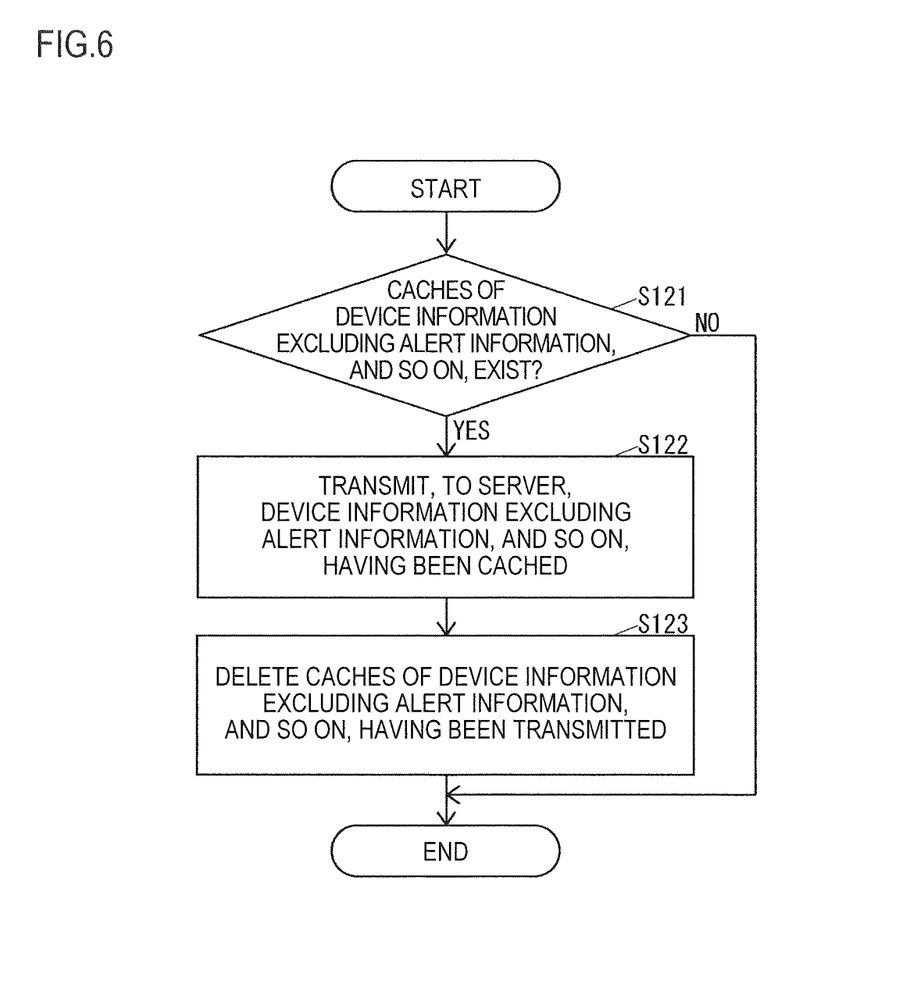
FIG. 6 is a flowchart illustrating an operation of the print job transmission device shown in FIG. 3 performed to transmit, to the server, user session information and device information excluding alert information.

Next, FIG. 6 is a flowchart illustrating an operation of the print job transmission device 30 performed to transmit, to the server 40, the user session information and the device information excluding the alert information. The control portion 35 of the print job transmission device 30 executes the operation shown in FIG. 6 at a constant time interval.

In step S121, the server communication portion 35*b* makes a judgment on whether or not there exists a cache of the user session information and the device information excluding the alert information. In a case where there exists no cache of the user session information and the device information excluding the alert information, the operation shown in FIG. 6 is finished. In a case where there exists a cache of the user session information and the device information excluding the alert information, the process proceeds to step S122.

In step S122, the server communication portion 35*b* transmits, to the server, by using, for example, REST API, Request of the user session information and the device information excluding the alert information, the user session information and the device information having been cached in step S106. Thereby, the control portion 45 of the server 40 manages, in the storage portion 44, the user session information and the device information excluding the alert information, the user session information and the device information having been transmitted in step S122.

Figure 7:
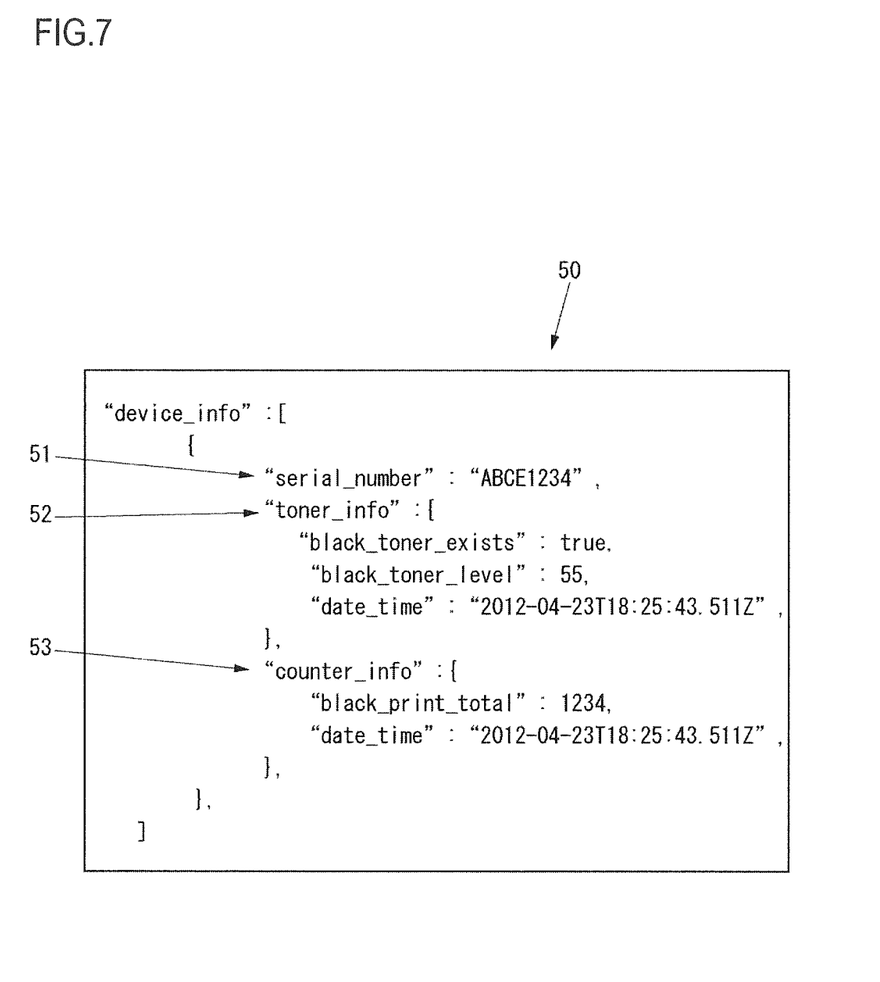
FIG. 7 is a diagram showing an example of Request of the device information excluding the alert information transmitted from the print job transmission device shown in FIG. 3 to the server.

FIG. 7 is a diagram showing an example of Request 50 of the device information excluding the alert information, which is transmitted from the print job transmission device 30 to the server 40 in step S122. Request 50 shown in FIG. 7 includes a serial number 51 of the image forming apparatus 20, toner information 52 of the image forming apparatus 20, counter information 53 in the image forming apparatus 20 immediately after the end of the execution of the target job.

In the example shown in FIG. 7, the serial number 51 is "ABCE1234".

In the example shown in FIG. 7, the toner information 52 includes information of presence/absence of black toner, information of a remaining amount of black toner, and information of date and time when the print job transmission device 30 obtained these pieces of information. Here, provided as the information of presence/absence of black toner is "true", which means that the black toner exists, and the remaining amount of the black toner is "55". The date and time when the print job transmission device 30 obtained these pieces of information is "2012-04-23T18:25: 43.511Z".

In the example shown in FIG. 7, the counter information 53 includes the number of copies having been printed in black, and a date and time when the print job transmission device 30 obtained the number of copies having been printed in black. Here, the number of copies having been printed in black is "1234", the date and time when the print job transmission device 30 obtained the number of copies is "2012-04-23T18:25:43.511Z".

Here, neither information of color toner nor information of the number of copies having been printed in color is included in the example shown in FIG. 7. In a case where the image forming apparatus 20 has a color printing function, the toner information 52 includes information regarding color toners, and the counter information 53 includes information regarding the number of copies having been printed in color.

In step S123 in FIG. 6, the server communication portion 35*b* deletes the cache of the user session information and the device information excluding the alert information, the user session information and the device information having been transmitted in step S122. Then the operation shown in FIG. 6 is finished.

Figure 8:
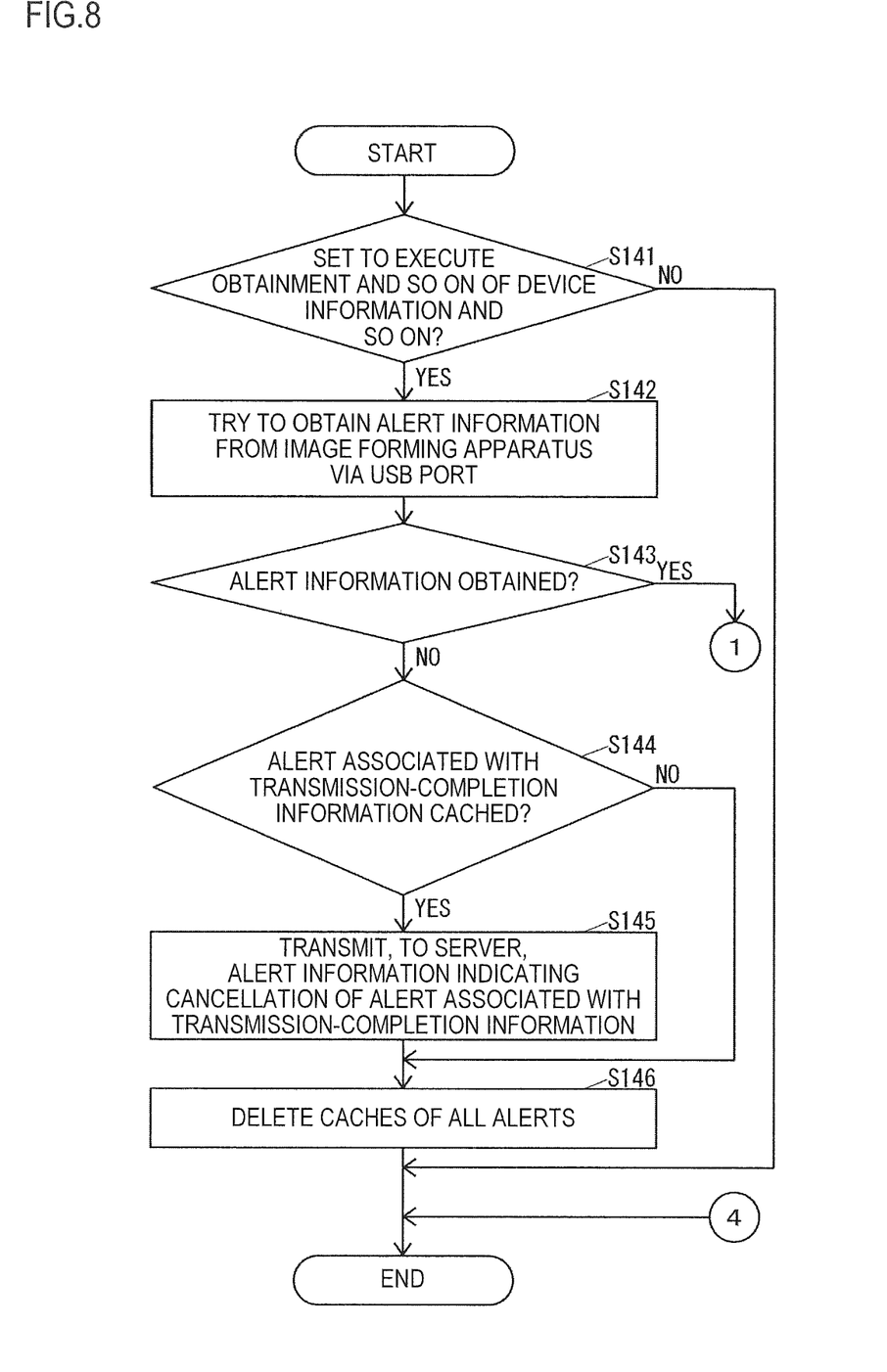
FIG. 8 is a flowchart illustrating part of an operation of the print job transmission device shown in FIG. 3 performed to obtain the alert information from the image forming apparatus and transmit the obtained alert information to the server.
Figure 9:
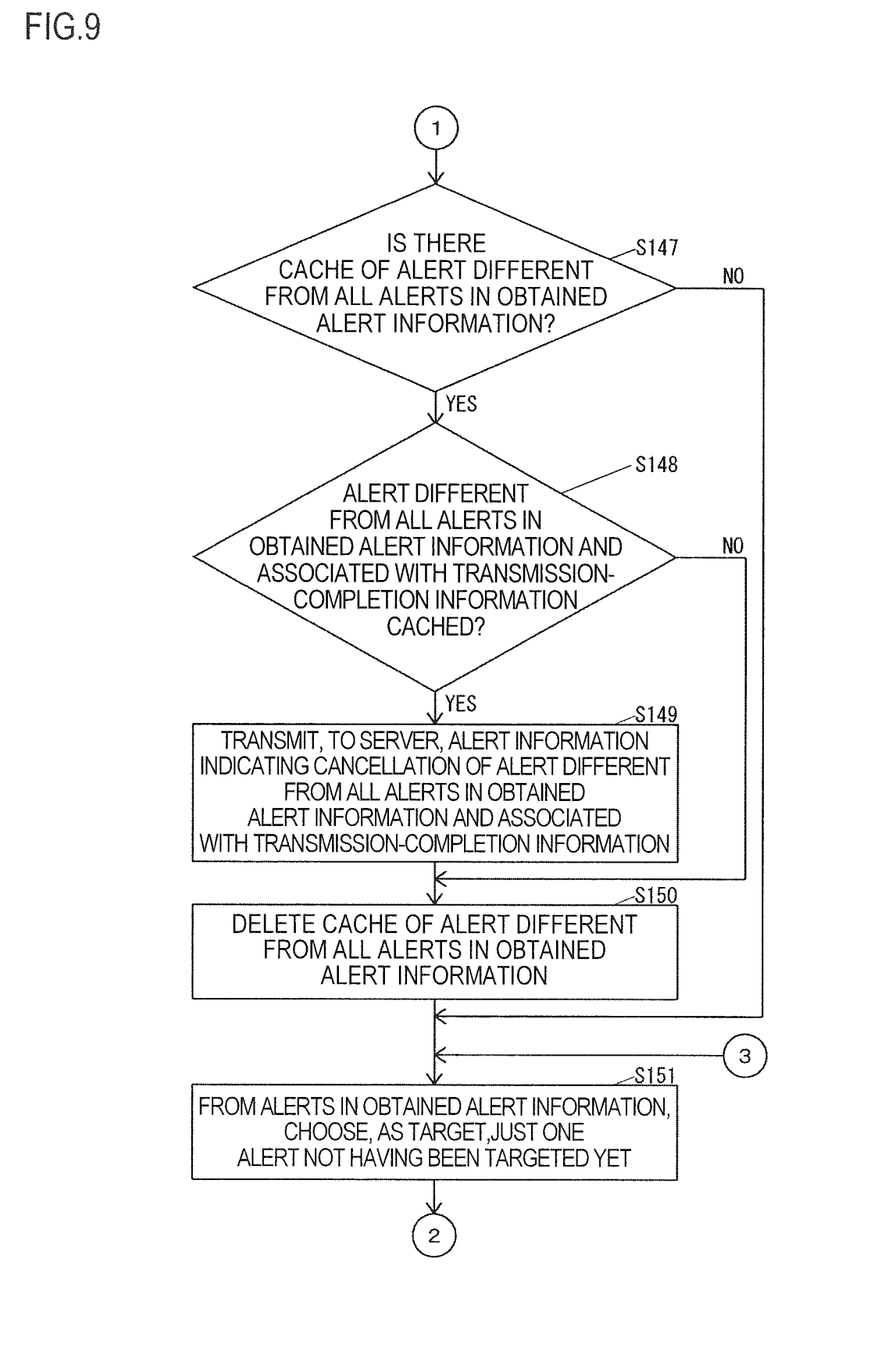
FIG. 9 is a flowchart following the flowchart shown in FIG. 8.
Figure 10:
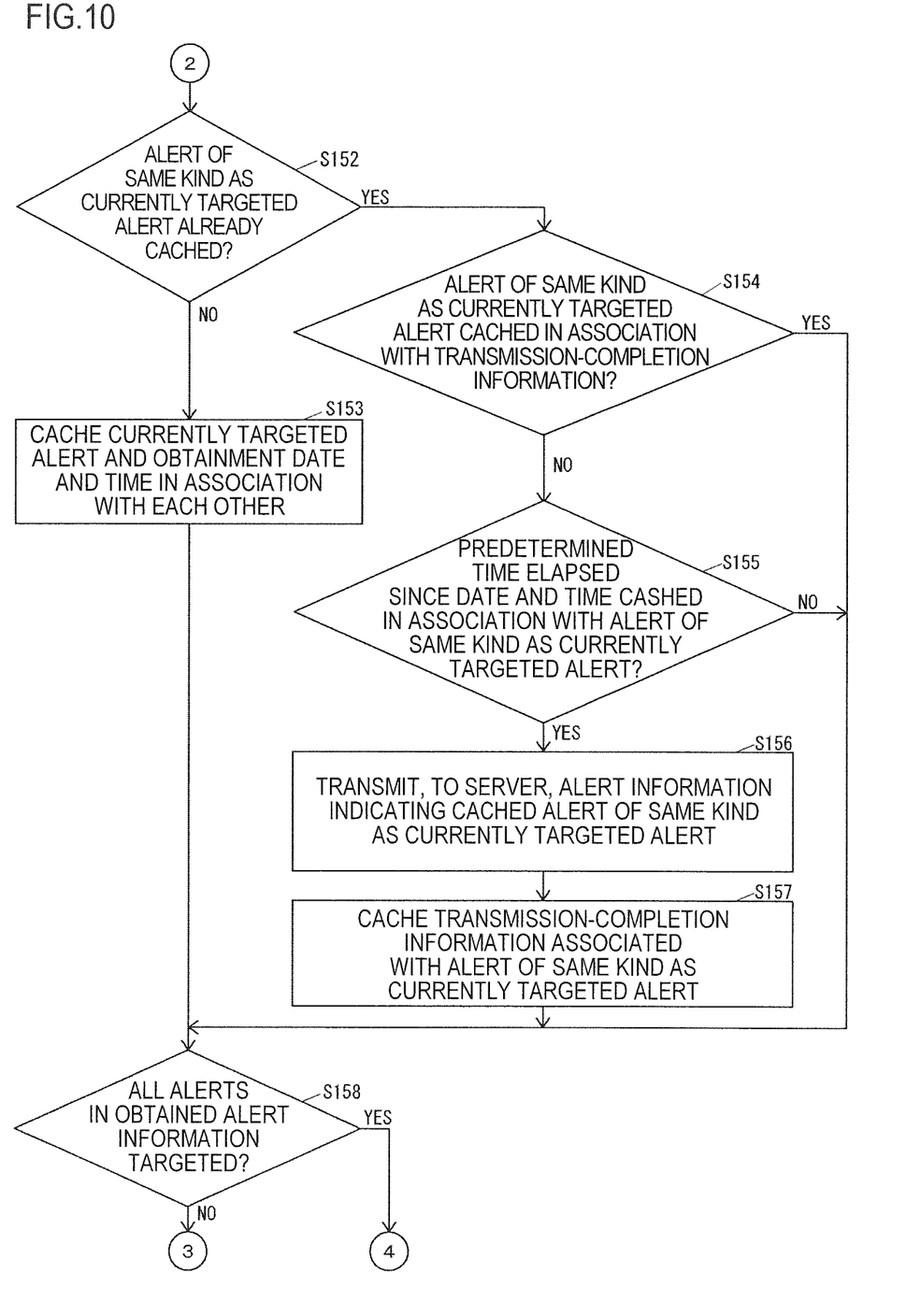
FIG. 10 is a flowchart following the flowchart shown in FIG. 9.

Next, FIG. 8 to FIG. 10 are flowcharts illustrating an operation of the print job transmission device 30 in a case of obtaining the alert information from the image forming apparatus 20 to transmit the obtained alert information to the server 40. The control portion 35 of the print job transmission device 30 continues to execute the operation shown in FIG. 8 to FIG. 10 at a constant time interval of, for example, several milliseconds to several seconds. Thus, the device communication portion 35*a* obtains the alert information with timing that is independent of the timing of transmitting a print job to the image forming apparatus 20.

In step S141, the device communication portion 35*a* makes a judgment on whether or not a setting has been made to execute "obtaining the device information and the user session information from the image forming apparatus 20 to transmit the obtained pieces of information to the server 40".

In a case where a setting has been made such that "obtaining the device information and the user session information from the image forming apparatus 20 to transmit the obtained pieces of information to the server 40" is not to be executed, the operation shown in FIG. 8 to FIG. 10 is finished. In a case where a setting has been made such that "obtaining the device information and the user session information from the image forming apparatus 20 to transmit the obtained pieces of information to the server 40" is to be executed, the process proceeds to step S142.

In step S142, the device communication portion 35*a*, by a PJL command, tries to obtain the alert information from the image forming apparatus 20 via the USB port. That is, the device communication portion 35*a* queries the image forming apparatus 20 for the alert information by polling.

In step S143, the server communication portion 35*b* makes a judgment on whether or not the alert information has been obtained from the image forming apparatus 20 in step S142. If the alert information has been obtained from the image forming apparatus 20, the process proceeds to step S147, but if not, the process proceeds to step S144.

In step S144, the server communication portion 35*b* makes a judgement on whether or not there has been cached an alert that is associated with transmission-completion information indicating that transmission to the server 40 has been completed. If no alert associated with the transmission-completion information has been cached, the process proceeds to step S146, but if such an alert has been cached, the process proceeds to step S145.

In step S145, the server communication portion 35*b* transmits, to the server 40, alert information that indicates cancellation of the alert having been cached in association with the transmission-completion information. That is, Request of alert information indicating that an alert is no longer obtained from the image forming apparatus 20 is transmitted to the server 40 by using, for example, the REST API. Here, Request transmitted in step S145 includes the serial number of the image forming apparatus 20 and current time. The control portion 45 of the server 40 manages, in the storage portion 44, the alert cancellation having been received in step S145.

In step S146, the server communication portion 35*b* deletes caches of all alerts in the case where no alert associated with the transmission-completion information has been cached, or when the processing in step S145 is finished. Then the operation shown in FIG. 8 to FIG. 10 is finished. Note that, in step S146, the server communication portion 35*b* also deletes the cache of the date and time and the transmission-completion information associated with an alert to be deleted.

In step S147, a judgement is made on whether or not there exists a cache of an alert that is different from all the alerts included in the alert information having been obtained in step S142. In a case where there exists no cache of an alert that is different from all the alerts included in the alert information having been obtained in step S142, the process proceeds to step S151. In a case where there exists a cache of an alert that is different from all the alerts included in the alert information having been obtained in step S142, the process proceeds to step S148.

In step S148, the server communication portion 35*b* makes a judgment on whether or not there exists a cache of an alert that is different from all the alerts included in the alert information having been obtained in step S142, and that is associated with the transmission-completion information. In a case where no such cache is found in step S148, the process proceeds to step S150, but in a case where there is found such a cache in step S148, the process proceeds to step S149.

In step S149, the server communication portion 35*b* transmits, to the server 40, alert information indicating cancellation of the alert that has been judged, in step S148, to have been cached. That is, Request of alert information indicating that an alert is no longer obtained from the image forming apparatus 20 is transmitted to the server 40 by using, for example, the REST API. Here, the server communication portion 35*b* makes Request transmitted in step S149 include the serial number of the image forming apparatus 20 and current time. The control portion 45 of the server 40 manages, in the storage portion 44, the alert cancellation having been received in step S149.

In step S150, the server communication portion 35*b* deletes the cache of an alert that is different from all the alerts included in the alert information having been obtained in step S142. Note that, in step S150, the server communication portion 35*b* also deletes the caches of the date and time and the transmission-completion information associated with the alerts to be deleted.

In step S151, the server communication portion 35*b* chooses, as a target, from among the alerts included in the alert information having been obtained in step S142, only an alert that has not yet been targeted in the processing performed in steps S151 to S158 shown in FIG. 8 to FIG. 10

In step S152, the server communication portion 35*b* makes a judgment on whether or not an alert of the same kind as a currently targeted alert has already been cached. In a case where an alert of the same kind as the currently targeted alert has been cached already, the process proceeds to step S154, but in a case where such an alert has not been cached yet, the process proceeds to step S153.

In step S153, the server communication portion 35*b* caches, in a mutually associated manner, the currently targeted alert and the obtaining date and time of the currently targeted alert by the print job transmission device 30. Then, the process proceeds to step S158.

In step S154, the server communication portion 35*b* makes a judgment on whether or not an alert of the same kind as the currently targeted alert has been cached in association with the transmission-completion information. In a case where an alert of the same kind as the currently targeted alert has been cached in association with the transmission-completion information, the process proceeds to step S158. In a case were no alert of the same kind as the currently targeted alert has been cached in association with the transmission-completion information, the process proceeds to step S155.

In step S155, the server communication portion 35*b* makes a judgment on whether or not a predetermined time, such as several minutes to several tens of minutes, has elapsed since the date and time in association with which the alert of the same kind as the currently targeted alert has been cached in step S153. In a case where the predetermined time has not elapsed, the process proceeds to step S158, but in a case where the predetermined time has elapsed, the process proceeds to step S156.

In step S156, the server communication portion 35*b* transmits, to the server 40, by using, for example, REST API, Request of alert information indicating an alert that is of the same kind as the currently targeted alert and that has been cached. Thereby, the control portion 45 of the server 40 manages, in the storage portion 44, the alert having been received in step S156.

Figure 11:
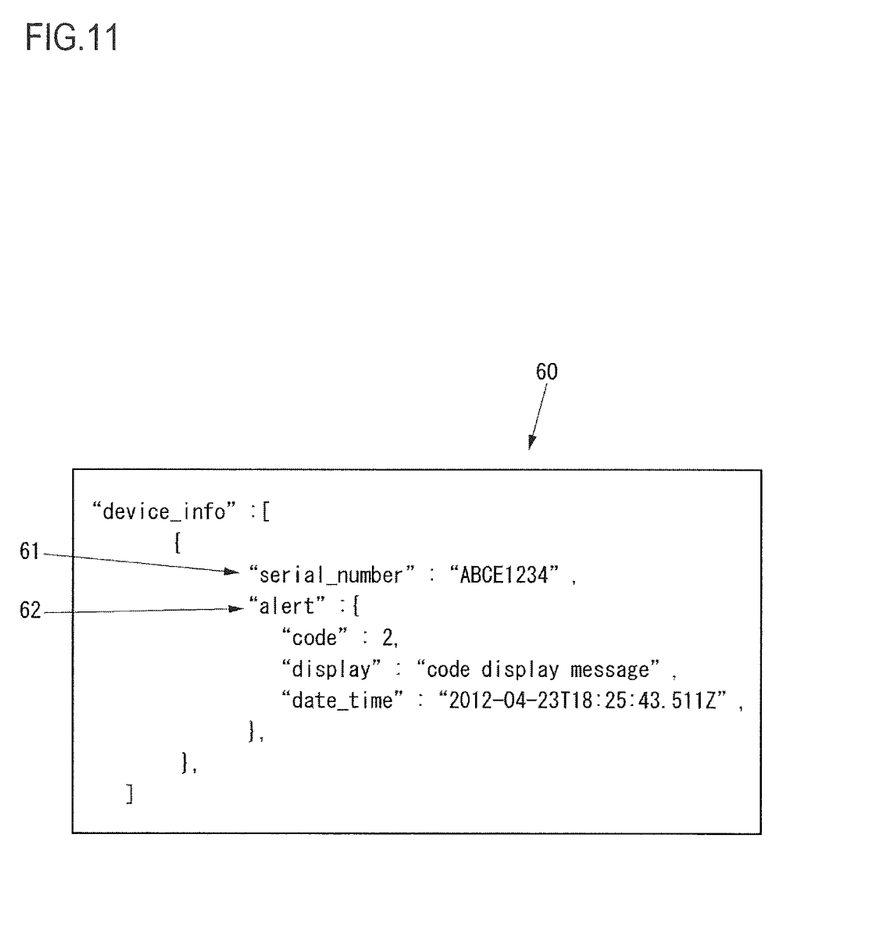
FIG. 11 is a diagram showing an example of Request of the alert information transmitted to the server from the print job transmission device shown in FIG. 3.

FIG. 11 is a diagram showing an example of Request 60 of the alert information transmitted from the print job transmission device 30 to the server 40 in step S156. Request 60 shown in FIG. 11 includes a serial number 61 of the image forming apparatus 20, and alert information 62 indicating an alert for sheet jam, for example, occurring in the image forming apparatus 20.

In the example shown in FIG. 11, the serial number 61 is "ABCE1234".

In the example shown in FIG. 11, the alert information 62 includes an alert code number, a display message, and an obtaining date and time. The display message is a message that is displayed on the display portion 42 of the server 40 regarding the alert denoted by the code number. The obtaining date and time is the date and time when the print job transmission device 30 obtained the alert, that is, the date and time that has been cached in association with this alert.

Here, the code number is "2", and the obtaining date and time is "2012-04-23T18:25:43.511Z". Further, although what is described as the display message in the figure is "code display message", the display message actually includes more specific messages such as "There is no toner.", "There is no sheet.", etc.

In FIG. 10, in step S157, the server communication portion 35b caches transmitted information associated with the alert that is indicated by the alert information having been transmitted in step S156 and that is of the same kind as the currently targeted alert.

In step S158, a judgment is made on whether or not all the alerts included in the alert information having been obtained in step S142 have been targeted in the processing of steps S151 to S158. If there is an alert left untargeted, the process proceeds to step S151, and the processing of steps S151 to S158 is repeated. In a case where all the alerts included in the alert information having been obtained in step S142 have been targeted, the operation shown in FIG. 8 to FIG. 10 is finished.

As described above, the print job transmission device 30 transmits a print job to the image forming apparatus 20 (step S102), and transmits device information obtained from the image forming apparatus 20 to the server 40 (step S105, S122). This makes it possible to make the server 40 manage the device information of the image forming apparatus 20 even when the image forming apparatus 20 and the server 40 are not communicable with each other. Accordingly, a manager of the image forming apparatus 20 in the printing system 10 is able to confirm the device information of each of a large number of image forming apparatuses 20 just by accessing the server 40.

Further, the print job transmission device 30 obtains an alert from the image forming apparatus 20 with timing that is independent of the timing of transmitting a print job to the image forming apparatus 20 (step S142). This makes it possible to make the server 40 manage the alert of the image forming apparatus 20 even in a period when no print job is transmitted to the image forming apparatus 20.

Further, the print job transmission device 30 continuously obtains an alert form the image forming apparatus 20, and transmits the alert to the server 40 when a predetermined time has elapsed since the obtainment of the alert (step S156). This helps prevent making the server 40 manage an alert of a low importance that soon stops being obtained from the image forming apparatus 20.

Further, when the alert having been transmitted to the server is no longer obtained from the image forming apparatus 20, the print job transmission device 30 transmits, to the server 40, the alert information indicating cancellation of the alert (steps S145, S149). This contributes to more accurate management of the image forming apparatus by the server 40.

Further, the print job transmission device 30 transmits a print job to the image forming apparatus 20 not via the network 12 (step S102), and obtains information of the image forming apparatus 20 not via the network 12 (step S105, step S142). This helps prevent increase of resources in the network 12 due to the communication between the print job transmission device 30 and the image forming apparatus 20. As a result, even in an environment where a bandwidth of the network 12 is narrow, it is possible to reduce communication delay in the network 12.

Further, the print job transmission device 30 transmits a print job to the image forming apparatus 20 via the USB port (step S102), and obtains the device information of the image forming apparatus 20 from the image forming apparatus 20 via the USB port (step S105, S142). This makes it possible to achieve, with a simple configuration, communication between the print job transmission device 30 and the image forming apparatus 20 not via the network 12.

The print job transmission device 30 may transmit a print job to the image forming apparatus 20 by a method other than the method of transmitting the print job via the USB port. The print job transmission device 30 may obtain the device information of the image forming apparatus 20 from the image forming apparatus 20 by a method other than the method of obtaining the device information via the USB port.

In the present embodiment, the printing system 10 does not include an image forming apparatus 20 that is connected to the network 12. However, the printing system 10 may include an image forming apparatus 20 that is connected to the network 12. In such a case, the print job transmission device 30 does not need to obtain the device information or the user session information from the image forming apparatus 20 that is connected to the network 12. And, the image forming apparatus 20 that is connected to the network 12 may transmit the device information or the user session information to the server 40 via the network 12.

Further, in the printing system 10, a print job transmitted from the print job transmission device 30 and received by the image forming apparatus 20 is immediately executed by the image forming apparatus 20. However, instead, a print job transmitted from the print job transmission device 30 may be once stored in the image forming apparatus 20, and the stored print job may be executed according to an instruction given via the operation portion 21 of the image forming apparatus 20.

What is claimed is:

1. A print job transmission device comprising:
a device communication portion which communicates with an image forming apparatus, which executes a print job, to transmit the print job to the image forming apparatus and obtain information of the image forming apparatus from the image forming apparatus; and
a server communication portion which transmits the information obtained by the device communication portion to a server which manages the information of the image forming apparatus,
wherein
the device communication portion obtains, from the image forming apparatus, specific information of the image forming apparatus with timing that is independent of timing of transmitting the print job to the image forming apparatus, and obtains, from the image forming apparatus, the information of the image forming apparatus excluding the specific information with timing that is dependent on the timing of transmitting the print job to the image forming apparatus, the server communication portion caches the information of the image forming apparatus obtained by the device communication portion excluding the specific information, when a cache of the information of the image forming apparatus excluding the specific information exists, the server communication portion transmits, to the server, the information of the image forming apparatus excluding the specific information, and then deletes the cache of the information of the image forming apparatus excluding the specific information, the device communication portion continuously queries the image forming apparatus for the specific information by polling, and the server communication portion transmits, to the server, the specific information when a predetermined time has elapsed since obtainment of the specific information by the device communication portion.

2. The print job transmission device according to claim 1, wherein in a case where the specific information is no longer obtained by the device communication portion after transmission of the specific information to the server by the server communication portion, the server communication portion transmits, to the server, information indicating that the specific information is no longer obtained from the image forming apparatus.

3. The print job transmission device according to claim 1, wherein the server communication portion transmits the information having been obtained by the device communication portion to the server via a network, and the device communication portion transmits the print job to the image forming apparatus not via the network, and obtains the information of the image forming apparatus from the image forming apparatus not via the network.

4. The print job transmission device according to claim 3, wherein the device communication portion transmits the print job to the image forming apparatus via a USB port, and obtains the information of the image forming apparatus from the image forming apparatus via the USB port.

5. The print job transmission device according to claim 1, wherein the specific information is alert information.

6. A printing system comprising:

an image forming apparatus which executes a print job;

a print job transmission device which transmits the print job to the image forming apparatus; and a server which manages information of the image forming apparatus, wherein the print job transmission device includes
  a device communication portion which communicates with the image forming apparatus to transmit the print job to the image forming apparatus and obtain the information of the image forming apparatus from the image forming apparatus; and
  a server communication portion which transmits the information having been obtained by the device communication portion to the server, the device communication portion obtains, from the image forming apparatus, specific information of the image forming apparatus from the image forming apparatus with timing that is independent of timing of transmitting the print job to the image forming apparatus, and obtains, from the image forming apparatus, the information of the image forming apparatus excluding the specific information with timing that is dependent on the timing of transmitting the print job to the image forming apparatus, the server communication portion caches the information of the image forming apparatus obtained by the device communication portion excluding the specific information, when a cache of the information of the image forming apparatus excluding the specific information exists, the server communication portion transmits, to the server, the information of the image forming apparatus excluding the specific information, and then deletes the cache of the information of the image forming apparatus excluding the specific information, the device communication portion continuously queries the image forming apparatus for the specific information by polling, and the server communication portion transmits, to the server, the specific information when a predetermined time has elapsed since obtainment of the specific information by the device communication portion.

7. The printing system according to claim 6, wherein the specific information is alert information.

8. A print job transmission method executed by a computer, the computer including:

a device communication portion which communicates with an image forming apparatus, which executes a print job, to transmit the print job to the image forming apparatus and obtain information of the image forming apparatus from the image forming apparatus; and a server communication portion which transmits the information having been obtained by the device communication portion to a server which manages the information of the image forming apparatus, the method comprising:

obtaining, with the device communication portion, specific information of the image forming apparatus from the image forming apparatus with timing that is independent of timing of transmitting the print job to the image forming apparatus, and obtaining, from the image forming apparatus, the information of the image forming apparatus excluding the specific information with timing that is dependent on the timing of transmitting the print job to the image forming apparatus, caching, with the server communication portion, the information of the image forming apparatus obtained by the device communication portion excluding the specific information, when a cache of the information of the image forming apparatus excluding the specific information exists, transmitting, with the server communication portion, to the server, the information of the image forming apparatus excluding the specific information, and deleting, with the server communication portion, the cache of the information of the image forming apparatus excluding the specific information after transmitting the information of the image forming apparatus excluding the specific information to the server, wherein the device communication portion continuously queries the image forming apparatus for the specific information by polling, and the server communication portion transmits, to the server, the specific information when a predetermined time has elapsed since obtainment of the specific information by the device communication portion.

9. The print job transmission method according to claim 8, wherein the specific information is, alert information.

* * * * *